United States Patent
Chou

(10) Patent No.: US 11,733,795 B2
(45) Date of Patent: Aug. 22, 2023

(54) FOLDABLE ELECTRONIC APPARATUS AND INPUT METHOD THEREOF

(71) Applicant: ASUSTeK COMPUTER INC., Taipei (TW)

(72) Inventor: Cheng-Wei Chou, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/739,190

(22) Filed: May 9, 2022

(65) Prior Publication Data

US 2023/0033055 A1 Feb. 2, 2023

(30) Foreign Application Priority Data

Aug. 2, 2021 (TW) .................................. 110128379

(51) Int. Cl.
*G06F 3/041* (2006.01)
*G06F 1/16* (2006.01)

(52) U.S. Cl.
CPC .......... *G06F 3/0416* (2013.01); *G06F 1/1616* (2013.01)

(58) Field of Classification Search
None
See application file for complete search history.

(56) References Cited

U.S. PATENT DOCUMENTS

| 2011/0254774 | A1 | 10/2011 | Yamamoto et al. |
| 2013/0076680 | A1* | 3/2013 | Jouin ........................ G06T 3/20 345/173 |
| 2019/0310720 | A1* | 10/2019 | Angelevski ........... G06F 3/1423 |

FOREIGN PATENT DOCUMENTS

| CN | 1111802 | 6/2003 |
| CN | 101470469 | 7/2009 |
| CN | 101477442 | 7/2009 |
| CN | 102238277 | 4/2017 |

* cited by examiner

*Primary Examiner* — Stephen T. Reed
(74) *Attorney, Agent, or Firm* — JCIPRNET

(57) ABSTRACT

An input method applied to a foldable electronic apparatus with pivotally connected first and second bodies is provided. The first body includes a display and a first G sensor. The second body includes a touch input portion and a second G sensor. First and second Euler angles of the first and second bodies are respectively detected by the first and second G sensors. A placement state of the foldable electronic apparatus is determined according to the first and second Euler angles. When the placement state is determined as a landscape state, the display displays a horizontal frame, and an input signal is executed according to the horizontal frame. When the placement state is converted to a portrait state, the horizontal frame is rotated to a portrait frame, the input signal is executed according to the portrait frame, and vertical and horizontal coordinates of the touch input portion are swapped.

8 Claims, 8 Drawing Sheets

FOLDABLE ELECTRONIC APPARATUS AND INPUT METHOD THEREOF

CROSS-REFERENCE TO RELATED APPLICATION

This application claims the priority benefit of Taiwan application serial no. 110128379, filed on Aug. 2, 2021. The entirety of the above-mentioned patent application is hereby incorporated by reference herein and made a part of this specification.

BACKGROUND

Technical Field

The disclosure relates to an electronic apparatus and an input method thereof; more particularly, the disclosure relates to a foldable electronic apparatus and an input method thereof.

Description of Related Art

A common foldable electronic apparatus is constituted by a screen and a base. In response to different usage requirements, the foldable electronic apparatus is designed to be able to flip, which allows the screen to be arbitrarily flipped with respect to the base or even flipped over the back of the base to become a tablet; meanwhile, an image on the screen is also correspondingly rotated according to the manner in which a user holds or places the foldable electronic apparatus.

However, when the foldable electronic apparatus is placed in a portrait state, a touchpad is located on left and right sides, which may easily cause the user to mistakenly touch the touchpad. Besides, coordinates of the touchpad are still oriented in a horizontal manner, which conflicts with the screen that has been changed to the portrait state. Thereby, a direction in which the user touches the touchpad may be inconsistent with a reaction direction on the screen, thus resulting in inconvenience of use.

SUMMARY

An embodiment of the disclosure provides an input method applied to a foldable electronic apparatus. The foldable electronic apparatus includes a first body and a second body pivotally connected to each other. The first body includes a display and a first gravity sensor (G sensor), and the second body includes a touch input portion and second G sensor. The method includes following steps. A first Euler angle of the first body and a second Euler angle of the second body in a three-dimensional space are respectively detected by the first G sensor and the second G sensor. When a placement state of the foldable electronic apparatus is determined as a landscape state, the display displays a horizontal frame, and an input signal received by the touch input portion is executed according to the horizontal frame; when the placement state is converted from the landscape state to a portrait state, the horizontal frame is rotated to a portrait frame, the input signal received by the touch input portion is executed according to the portrait frame, and a vertical coordinate and a horizontal coordinate of the touch input portion are swapped.

Another embodiment of the disclosure provides a foldable electronic apparatus which includes a first body, a second body, a storage apparatus, and a processor. The first body includes a display and a first G sensor. The second body is pivotally connected to the first body and includes a touch input portion and second G sensor. The storage apparatus stores a computer program. The processor is coupled to the display, the first G sensor, the touch input portion, the second G sensor, and the storage apparatus and is configured to load and execute the computer program, so as to respectively detect a first Euler angle of the first body and a second Euler angle of the second body in a three-dimensional space by the first G sensor and the second G sensor. According to first Euler angle and the second Euler angle, the processor is configured to determine a placement state of the foldable electronic apparatus. When the placement state is determined as a landscape state, the processor is configured to display a horizontal frame on the display and execute an input signal received by the touch input portion according to the horizontal frame. When the placement state is converted from the landscape state to a portrait state, the processor is configured to rotate the horizontal frame to a portrait frame, execute the input signal received by the touch input portion according to the portrait frame, and swap a vertical coordinate and a horizontal coordinate of the touch input portion.

In view of the above, in the foldable electronic apparatus and the input method thereof provided in one or more embodiments of the disclosure, the placement state of the foldable electronic apparatus and a folding/unfolding state of the two bodies are detected by the G sensors, the manner in which the screen displays and the display mode are correspondingly adjusted, and a direction and a manner in which the touch input portion is operated are adaptively adjusted. Thereby, the reaction direction on the image and the direction in which a user touches the touch input portion are consistent, which may provide an intuitive operation experience.

To make the above mentioned more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
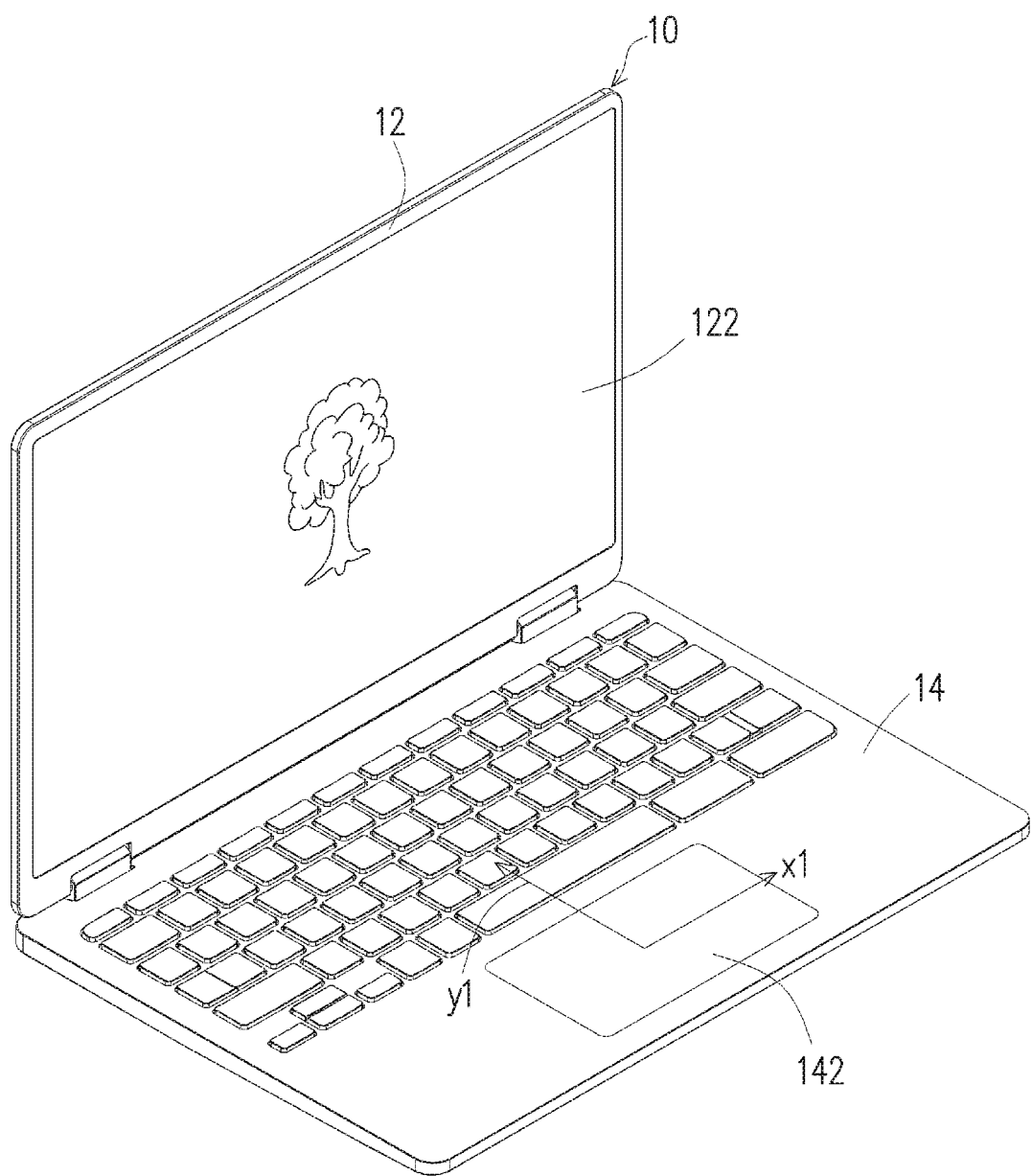
FIG. 1A to FIG. 1D are schematic views of a placement manner of a foldable electronic apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts FIG. 1A to FIG. 1D are schematic views of a placement manner of a foldable electronic apparatus according to an embodiment of the disclosure. With reference to FIG. 1A, a foldable electronic apparatus 10 provided in this embodiment includes a first body 12 and a second body 14 pivotally connected to each other. The first body 12 is equipped with a display 122, and the second body 14 is equipped with a touch input portion 142. The touch input portion 142 is, for instance, a touch pad, a touch screen, or any other touch input module, which should not be construed as a limitation in the disclosure.

In FIG. 1A, when the foldable electronic apparatus 10 is placed horizontally, a horizontal frame is displayed on the display 122. A coordinate system of the touch input portion 142 also takes a horizontal direction (i.e., an x1 direction in FIG. 1A) as an x-axis coordinate and takes a vertical direction (i.e., a y1 direction in FIG. 1A) as a y-axis coordinate.

Figure 1B:
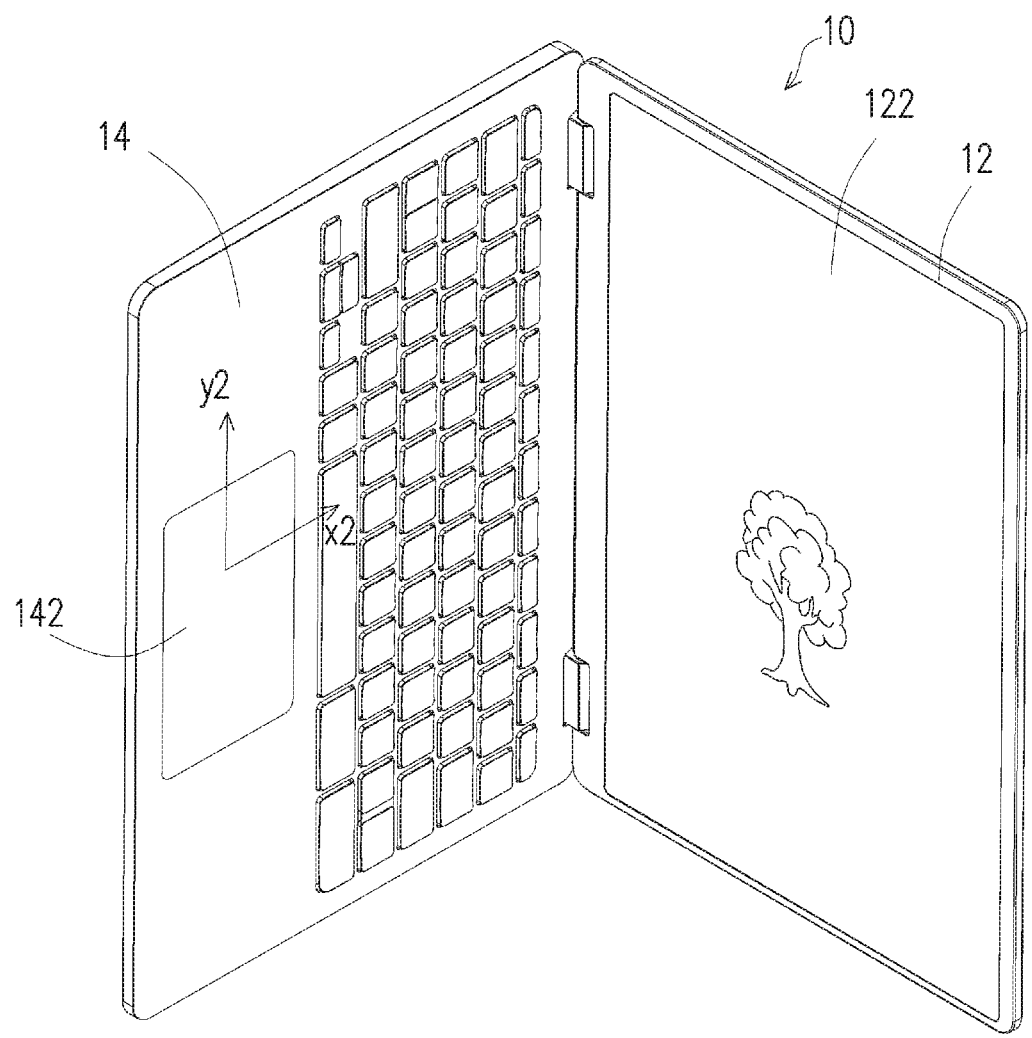

In FIG. 1B, when the foldable electronic apparatus 10 is rotated clockwise and placed vertically, the frame displayed on the display 122 is converted to a portrait frame. The coordinate system of the touch input portion 142 takes the rotated horizontal direction (i.e., an x2 direction in FIG. 1B) as the x-axis coordinate and takes the rotated vertical direction (i.e., a y2 direction in FIG. 1B) as the y-axis coordinate.

Figure 1C:
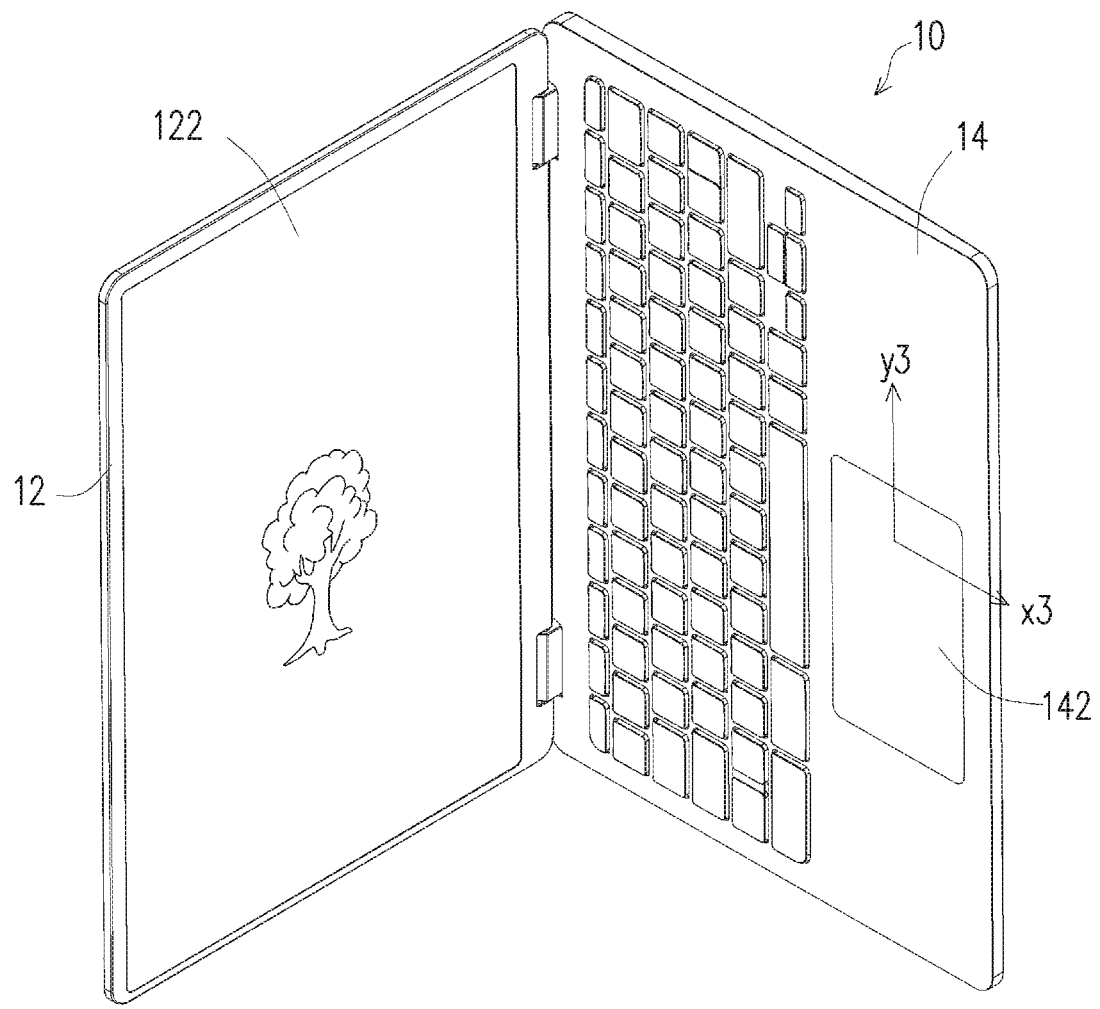

In FIG. 1C, when the foldable electronic apparatus 10 is rotated counterclockwise and placed vertically, the frame displayed on the display 122 is converted to a portrait frame. The coordinate system of the touch input portion 142 takes the rotated horizontal direction (i.e., an x3 direction in FIG. 1C) as the x-axis coordinate and takes the rotated vertical direction (i.e., a y3 direction in FIG. 1C) as the y-axis coordinate.

Figure 1D:
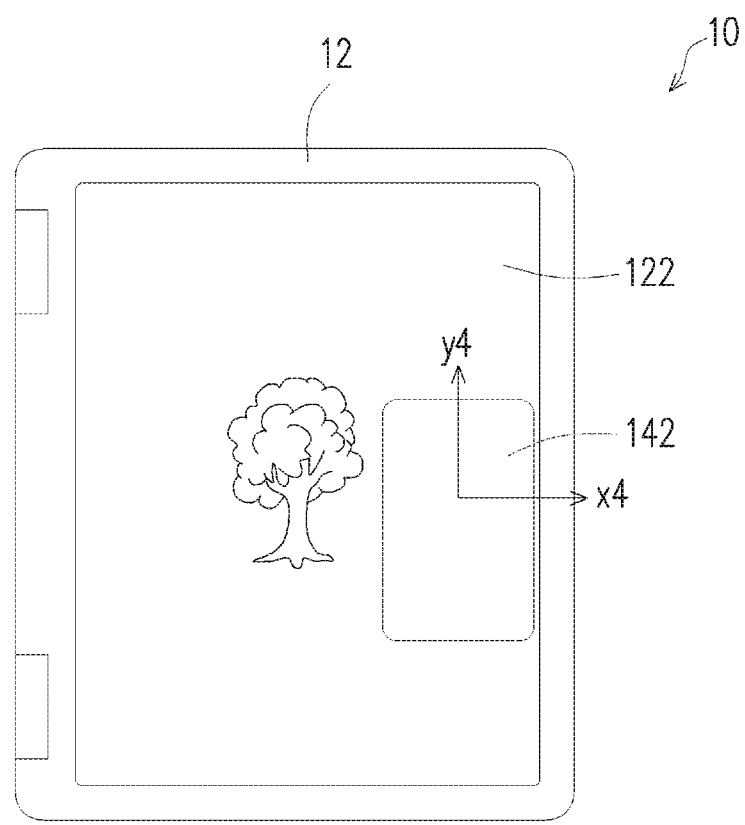

In FIG. 1D, when the foldable electronic apparatus 10 is rotated and placed vertically, and when the second body 14 is flipped over to a back side of the first body 12, the foldable electronic apparatus 10 enters a tablet mode. At this time, the frame displayed on the display 122 is converted to a portrait frame. The coordinate system of the touch input portion 142 (which is flipped over to the back side of the first body 12) takes the rotated and flipped horizontal direction (i.e., an x4 direction in FIG. 1D) as the x-axis coordinate and takes the rotated and flipped vertical direction (i.e., a y4 direction in FIG. 1D) as the y-axis coordinate. In an embodiment of the disclosure, the foldable electronic apparatus 10 may turn off a function of the touch input portion 142 after entering the tablet mode to prevent a user from accidentally touching the touch input portion 142.

Figure 2:
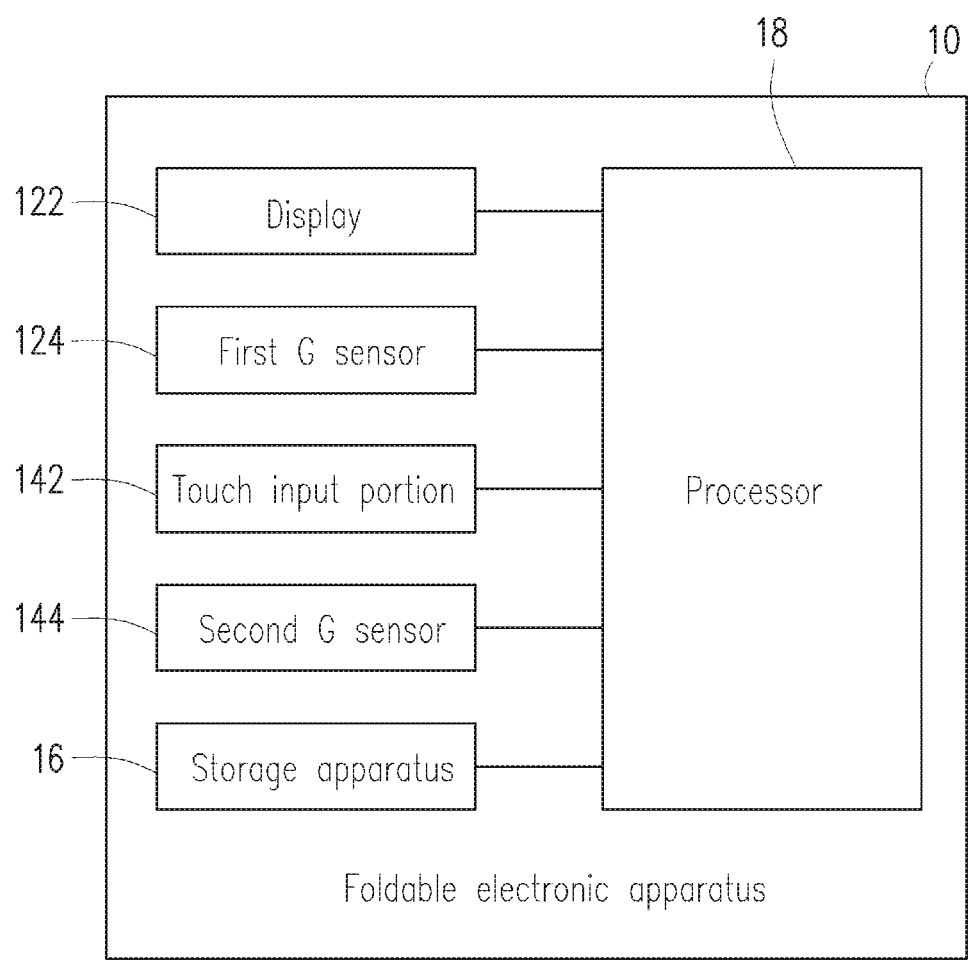
FIG. 2 is a block view of a foldable electronic apparatus according to an embodiment of the disclosure.

FIG. 2 is a block view of a foldable electronic apparatus according to an embodiment of the disclosure. With reference to FIG. 1A~FIG. 1D and FIG. 2, in this embodiment, internal devices of the foldable electronic apparatus 10 in FIG. 1 are illustrated. Here, the foldable electronic apparatus 10 includes a display 122, a first G sensor 124, a touch input portion 142, a second G sensor 144, a storage apparatus 16, and a processor 18 coupled to these devices. Functions of the above-mentioned devices and apparatus are described below.

In an embodiment of the disclosure, the touch input portion 142 is, for instance, a resistive or capacitive touch pad which may provide a touch detection function. The touch input portion 142 may also be combined with a display panel to provide display and touch detection functions at the same time.

The first G sensor 124 and the second G sensor 144 are, for instance, triaxial accelerometers which measure changes of some minor physical quantities, such as a resistance value, a capacitance value, and so on, so as to provide an acceleration value in three-axial directions. After formula conversion, an Euler angle in the three-dimensional space may be obtained, e.g., an angle of dual-axis inclination is plus or minus 90 degrees or 0-360 degrees. In this embodiment, by arranging the first G sensor 124 and the second G sensor 144 on the first body 12 and second body 14 of the foldable electronic apparatus 10, respectively, the Euler angle of the first body 12 and the Euler angle of the second body in the three-dimensional space may be detected.

The Euler angle, for instance, includes a pitch angle, a yaw angle, and a roll angle and may reflect an orientation of the first G sensor 124 and the second G sensor 144 relative to the horizontal plane. In some embodiments of the disclosure, the first G sensor 124 and the second G sensor 144 may be applied together with a gyroscope and/or a magnetic sensor to provide angle information in the three-dimensional space with accuracy.

The storage apparatus 16 is configured to store a computer program or various application programs may can be executed by the processor 18. The processor 18 is responsible for the overall operation of the foldable electronic apparatus 10 and loads the computer program from the storage apparatus 16 to execute the input method of the foldable electronic apparatus provided in one or more embodiments of the disclosure.

Figure 3:
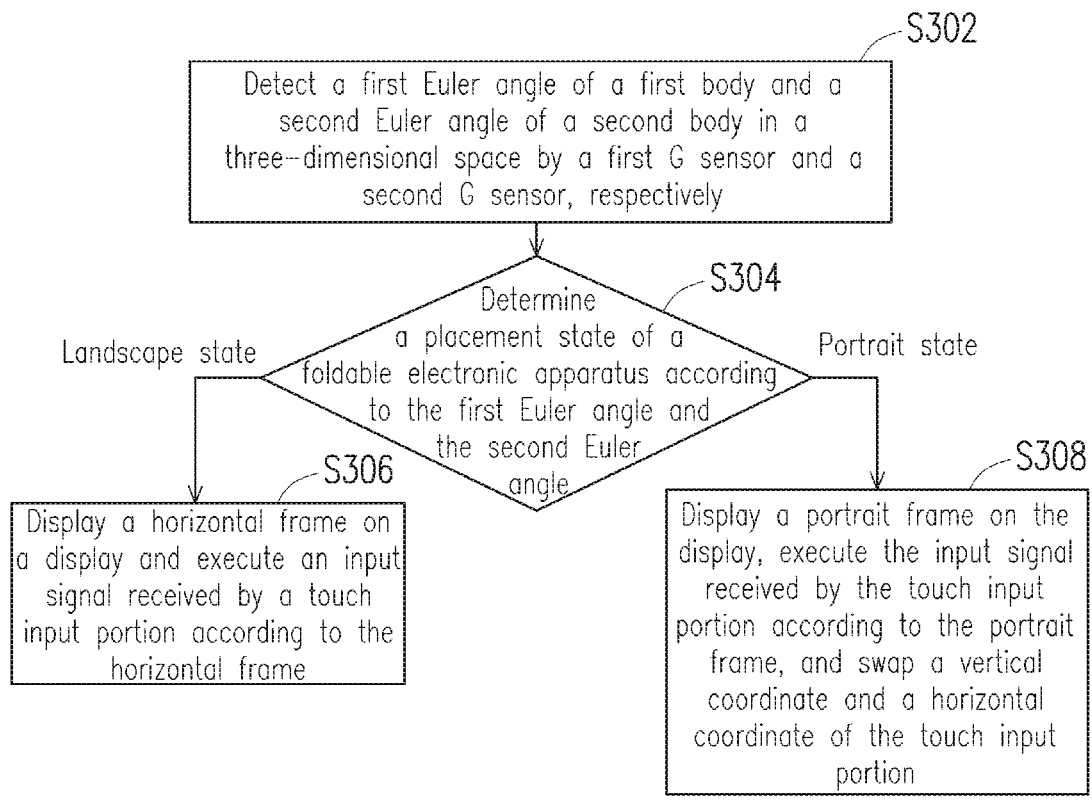
FIG. 3 is a flowchart of an input method of a foldable electronic apparatus according to an embodiment of the disclosure.

FIG. 3 is a flowchart of an input method of a foldable electronic apparatus according to an embodiment of the disclosure. With reference to FIG. 1A~FIG. 1D, FIG. 2, and FIG. 3, the method provided in this embodiment is applied to the foldable electronic apparatus 10 depicted in FIG. 2. Detailed steps of the input method of the foldable electronic apparatus provided in this embodiment are elaborated with reference to various devices and components of the foldable electronic apparatus 10.

In step S302, the processor 18 detects the first Euler angle of the first body 12 and the second Euler angle of the second body 14 in the three-dimensional space by the first G sensor 124 and the second G sensor 144, respectively.

In step S304, the processor 18 determines a placement state of the foldable electronic apparatus 10 according to the first Euler angle and the second Euler angle. For instance, if the pitch angle, the yaw angle, or the roll angle of the first Euler angle and the second Euler angle reaches 90 degrees, it may be determined that the foldable electronic apparatus 10 is in a portrait state.

When the processor 18 determines that the foldable electronic apparatus 10 is in a landscape state, in step S306, the processor 18 displays a horizontal frame on the display 122 and executes an input signal received by the touch input portion 142 according to the horizontal frame.

When the processor 18 determines that the foldable electronic apparatus 10 is in a portrait state, in step S308, the processor 18 displays a portrait frame on the display 122, executes the input signal received by the touch input portion 142 according to the portrait frame, and swaps a vertical coordinate and a horizontal coordinate of the touch input portion 142, which allows a direction in which a user performs actions on the touch input portion 142 to be consistent with the reaction direction on the display frame.

In an embodiment of the disclosure, when the processor 18 determines that the foldable electronic apparatus 10 is in the portrait state, an embedded controller of the foldable electronic apparatus 10 or the processor 18 directly sends a signal to the touch input portion 142. After the firmware of the touch input portion 142 receives the signal, the vertical coordinate and the horizontal coordinate of the touch input portion 142 are swapped.

In an embodiment of the disclosure, when the processor 18 determines that the foldable electronic apparatus 10 is in the portrait state, the processor 18 sends a signal to the touch input portion 142 to turn off the touch detection function on an edge of the touch input portion 142 or reduce the sensitivity to avoid an accidental touch.

In an embodiment of the disclosure, when the processor 18 determines that the foldable electronic apparatus 10 is in the portrait state, the processor 18 sends a signal to the touch input portion 142 to correspondingly adjust operation key buttons (e.g., the Page Up and Page Down keys) on the edge of the touch input portion 142, which may facilitate users' operations.

Figure 4:
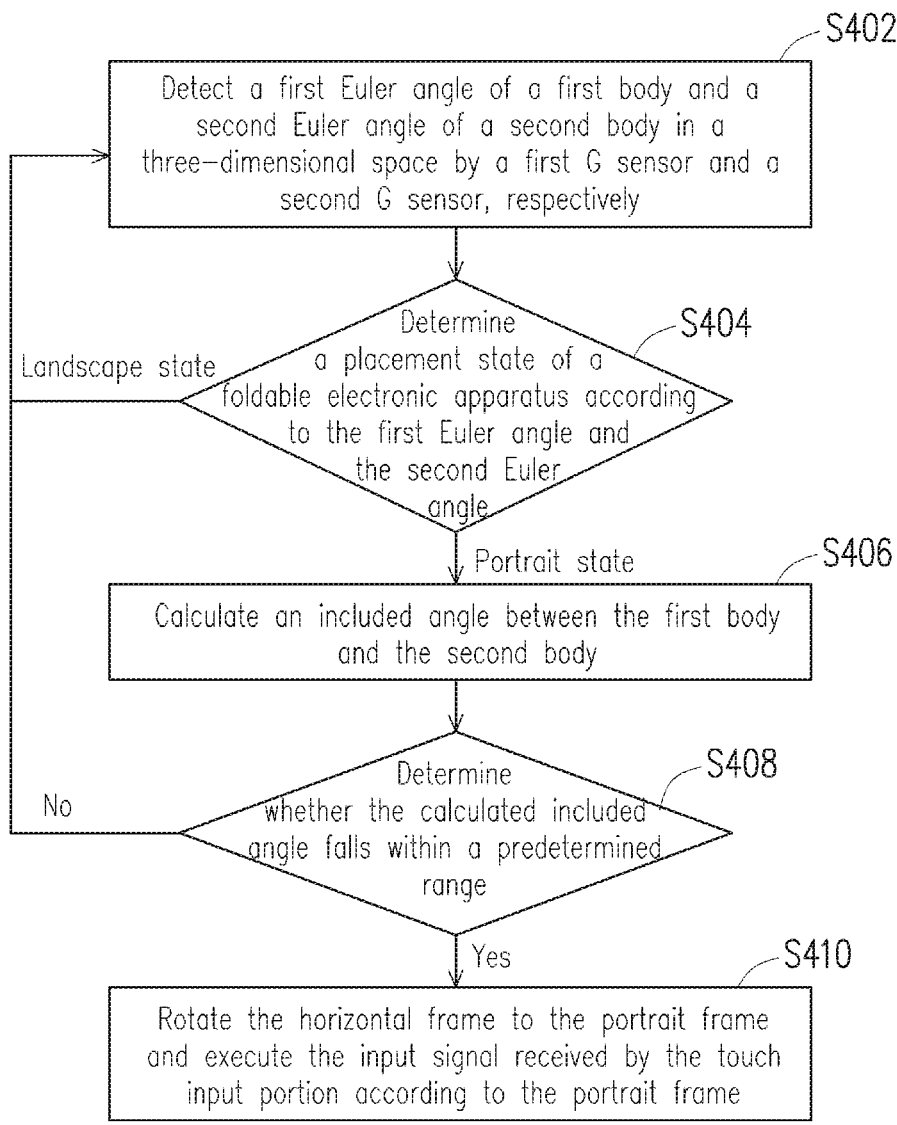
FIG. 4 is a flowchart of an input method of a foldable electronic apparatus according to an embodiment of the disclosure.

FIG. 4 is a flowchart of an input method of a foldable electronic apparatus according to an embodiment of the disclosure. With reference to FIG. 1A~FIG. 1D, FIG. 2, and FIG. 4, the method provided in this embodiment is applied to the foldable electronic apparatus 10 depicted in FIG. 2. Detailed steps of the input method of the foldable electronic apparatus provided in this embodiment are elaborated with reference to various devices and components of the foldable electronic apparatus 10.

In step S402, the processor 18 respectively detects the first Euler angle of the first body 12 and the second Euler angle of the second body 14 in the three-dimensional space by the first G sensor 124 arranged on the first body 12 and the second G sensor 144 arranged on the second body 14. In step S404, the processor 18 determines the placement state of the foldable electronic apparatus 10 according to the first Euler angle and the second Euler angle. The steps S402 to S404 are the same as or similar to the steps S302 to S304 provided in the foregoing embodiment, and thus the explanation of the details of these steps is omitted hereinafter.

In an embodiment of the disclosure, when the processor 18 determines that the foldable electronic apparatus 10 is in the portrait state, step S406 is performed to calculate an included angle between the first body 12 and the second body 14 according to the detected first Euler angle and the detected second Euler angle, and in step S408, it is determined whether the calculated included angle is within a predetermined range, so as to learn whether the user intends to change an operation mode of the foldable electronic apparatus 10.

For instance, if the calculated included angle falls within a range from 30 degrees to 170 degrees, it may be inferred that the user intends to apply a book mode of the foldable electronic apparatus 10; if the calculated included angle falls within a range from 350 degrees to 360 degrees, it may be inferred that the user intends to apply a tablet mode of the foldable electronic apparatus 10; if the calculated included angle falls within a range of other angles, it may be inferred that the user does not intend to change the operation mode of the foldable electronic apparatus 10.

In this embodiment, when the processor 18 determines that the calculated included angle is within the predetermined range, in step S410, the horizontal frame displayed on the display 122 is rotated to the portrait frame, and the input signal received by the touch input portion 142 is executed according to the portrait frame.

In step S408, when the processor 18 determines that the calculated included angle does not fall within the predetermined range, or in step S404, when the processor determines that the foldable electronic apparatus 10 is in the landscape state, the processor 18 then goes back to step S402, continues to detect the change of the Euler angles of the first body 12 and the second body 14, and again performs steps S404 to S408 to determine whether it is necessary to switch between the display frame and the touch function.

Through the input method, the foldable electronic apparatus 10 may accurately predict the user's intention of use and adaptively adjust the frame and the touch operation, thereby providing an operating environment that meets the user's intention of use.

In an embodiment of the disclosure, the operation mode of the foldable electronic apparatus 10 may be categorized into a left-hand operation mode (i.e., the touch input portion 142 is on the left) and a right-hand operation mode (i.e., the touch input portion 142 is on the right) according to a direction in which the user rotates the foldable electronic apparatus 10 (in a clockwise or a counterclockwise direction). Therefore, the processor 18 may further determine a relative location between the first body 12 and the second body 14 to determine the operation mode of the user and correspondingly adjust the settings of the display 122 and the touch input portion 142.

Figure 5:
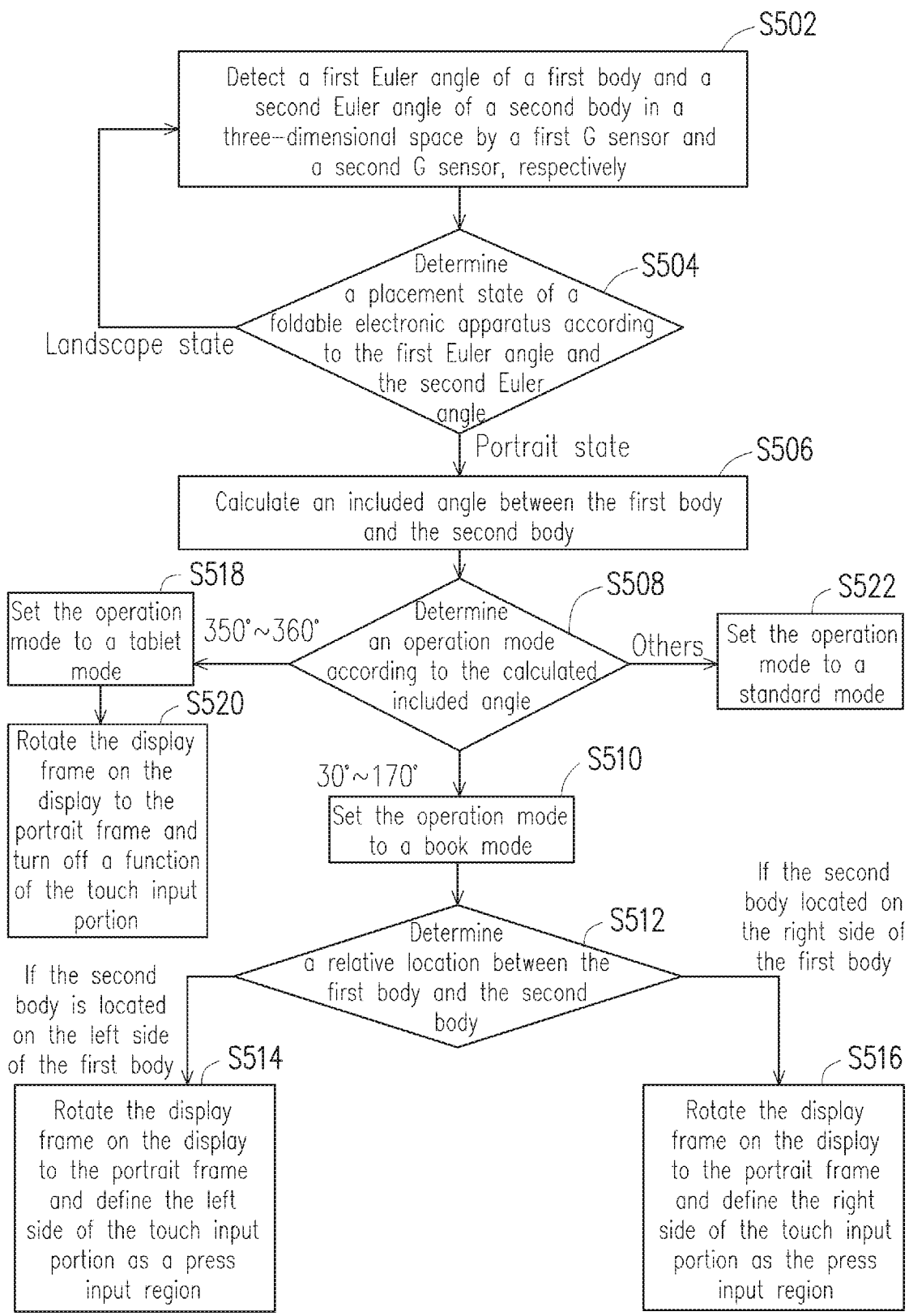
FIG. 5 is a flowchart of an input method of a foldable electronic apparatus according to an embodiment of the disclosure.

FIG. 5 is a flowchart of an input method of a foldable electronic apparatus according to an embodiment of the disclosure. With reference to FIG. 1A~FIG. 1D, FIG. 2, and FIG. 5, the method provided in this embodiment is applied to the foldable electronic apparatus 10 depicted in FIG. 2. Detailed steps of the input method of the foldable electronic apparatus provided in this embodiment are elaborated with reference to various devices and components of the foldable electronic apparatus 10.

In step S502, the processor 18 respectively detects the first Euler angle of the first body 12 and the second Euler angle of the second body 14 in the three-dimensional space by the first G sensor 124 and the second G sensor. In step S504, the processor 18 determines the placement state of the foldable electronic apparatus 10 according to the first Euler angle and the second Euler angle.

When the processor 18 determines that the foldable electronic apparatus 10 is in the portrait state, step S506 is performed, and the included angle between the first body 12 and the second body 14 is calculated according to the detected first Euler angle and second Euler angle. The steps S502 to S506 are the same as or similar to the steps S402 to S406 provided in the foregoing embodiment, and thus the explanation of the details of these steps is omitted hereinafter.

In step S508, an operation mode is determined according to the calculated included angle. In an embodiment of the disclosure, when the processor 18 determines that the calculated included angle is within the range from 30 degrees to 170 degrees, the processor 18 may determine that the user intends to apply the book mode, and in step S510, the operation mode of the foldable electronic apparatus 10 is set to the book mode.

At this time, the processor 18 in step S512 determines the relative location between the first body 12 and the second body 14 according to the calculated first Euler angle and the calculated second Euler angle.

In an embodiment of the disclosure, when the processor 18 determines that the second body 14 is located on the left side of the first body 12, in step S514, the display 122 displays the portrait frame, and the left side of the touch input portion 142 is defined as a press input region.

In an embodiment of the disclosure, when the processor 18 determines that the second body 14 is located on the right side of the first body 12, in step S516, the display 122 displays the portrait frame, and the right side of the touch input portion 142 is defined as the press input region.

In step S518, when the processor 18 determines that the calculated included angle is within the range from 350 degrees to 360 degrees, the processor 18 may determine that the user intends to apply the tablet mode, and the operation mode of the foldable electronic apparatus 10 is set to the tablet mode; in step 520, the image frame displayed on the display 122 is rotated to the portrait frame, and the function of the touch input portion 142 is turned off to prevent the user from accidentally touching the touch input portion 142.

If the calculated included angle falls within a range of other angles, it may be inferred that the user does not intend to change the operation mode of the foldable electronic apparatus 10 (in step S522, the operation mode is set to a standard mode).

In an embodiment of the disclosure, when the processor 18 determines that the user intends to apply the tablet mode, the processor 18 may further display the image frame on the display 22 corresponding to the operating system of a tablet, and the touch input portion 142 is operated corresponding to an operating system of a tablet, which should not be construed as a limitation in the disclosure.

In an embodiment of the disclosure, the processor 18 may display a dialog window for switching the operating system on the display 22, which allows the user to choose whether to switch to the operating system of the tablet.

In an embodiment of the disclosure, the processor 18 may further determine the location of the touch input portion 142 relative to the first body 12 and the second body 14 and select to enter the left-hand operation mode or the right-hand operation mode. That is, when it is determined that the touch input portion 142 is located on the back side of the first body 12 and is located on the left side of the second body 14, the left side of the touch input portion 142 is defined as the press input region, and when it is determined that the touch input portion 142 is located on the back side of the first body 12 and is located on the right side of the second body 14, the right side of the touch input portion 142 is defined as the press input region.

To sum up, in the input method of the foldable electronic apparatus provided in one or more embodiments of the disclosure, the placement state of the foldable electronic apparatus and the folding/unfolding state of the two bodies are detected by the G sensors, thereby distinguishing a variety of different operation modes. In addition to the conversion of the display image frame, the operating direction and the operating manner of the operating system and the touch input portion may be further converted, so that the reaction direction on the display frame and the direction in which the user performs actions on the touch input portion remain consistent, which may provide an intuitive operation experience.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An input method, applied to a foldable electronic apparatus, the foldable electronic apparatus comprising a first body and a second body pivotally connected to each other, the first body comprising a display and a first gravity sensor, the second body comprising a touch input portion and a second gravity sensor, the input method comprising:

respectively detecting a first Euler angle of the first body and a second Euler angle of the second body in a three-dimensional space by the first gravity sensor and the second gravity sensor; and determining a placement state of the foldable electronic apparatus according to the first Euler angle and the second Euler angle;

when the placement state is determined as a landscape state, displaying a horizontal frame on the display and executing an input signal received by the touch input portion according to the horizontal frame;

when the placement state is converted from the landscape state to a portrait state, rotating the horizontal frame to a portrait frame, executing the input signal received by the touch input portion according to the portrait frame, and swapping a vertical coordinate and a horizontal coordinate of the touch input portion, wherein the step of determining the placement state of the foldable electronic apparatus according to the detected first Euler angle and the detected second Euler angle further comprises:

calculating an included angle between the first body and the second body and determining whether the included angle is within a predetermined range; and when the included angle is within the predetermined range, rotating the horizontal frame to the portrait frame and executing the input signal received by the touch input portion according to the portrait frame, wherein when the included angle is within the predetermined range, the step of rotating the horizontal frame to the portrait frame and executing the input signal received by the touch input portion according to the portrait frame further comprises:

determining a relative location between the first body and the second body according to the first Euler angle and the second Euler angle;

when it is determined that the second body is located on a left side of the first body, defining a left side of the touch input portion as a press input region; and when it is determined that the second body is located on a right side of the first body, defining a right side of the touch input portion as the press input region.

2. The input method according to claim 1, wherein when the included angle is within the predetermined range, the step of rotating the horizontal frame to the portrait frame and executing the input signal received by the touch input portion according to the portrait frame executed further comprises:

displaying the portrait frame corresponding to an operating system of a tablet, wherein at least one function of the touch input portion is adapted to be performed on the corresponding operating system of the tablet.

3. The input method according to claim 2, wherein the step of displaying the portrait frame corresponding to the operating system of the tablet, wherein the at least one function of the touch input portion is adapted to be performed on the operating system of the tablet, comprises:

turning off the at least one function of the touch input portion.

4. The input method according to claim 2, wherein the step of displaying the portrait frame corresponding to the operating system of the tablet, wherein the at least one function of the touch input portion is adapted to be performed on the operating system of the tablet, further comprises:

determining a location of the touch input portion relative to the first body and the second body according to the first Euler angle and the second Euler angle;

when it is determined that the touch input portion is located on a back side of the first body and is located on a left side of the second body, defining a left side of the touch input portion as a press input region; and when it is determined that the touch input portion is located on the back side of the first body and is located on a right side of the second body, defining a right side of the touch input portion as the press input region.

5. A foldable electronic apparatus, comprising:

a first body, comprising a display and first gravity sensor;

a second body, pivotally connected to the first body and comprising a touch input portion and a second gravity sensor;

a storage apparatus, storing a computer program; and a processor, coupled to the display, the first gravity sensor, the touch input portion, the second gravity sensor, and the storage apparatus and configured to load and execute the computer program to:

respectively detect a first Euler angle of the first body and a second Euler angle of the second body in a three-dimensional space by the first gravity sensor and the second gravity sensor;

determine a placement state of the foldable electronic apparatus according to the first Euler angle and the second Euler angle;

when the placement state is determined as a landscape state, display a horizontal frame on the display and execute an input signal received by the touch input portion according to the horizontal frame; and when the placement state is converted from the landscape state to a portrait state, rotate the horizontal frame to a portrait frame, execute the input signal received by the touch input portion according to the portrait frame, and swap a vertical coordinate and a horizontal coordinate of the touch input portion, wherein the processor further calculates the included angle between the first body and the second body and determines whether the included angle is within a predetermined range, and when the included angle is within the predetermined range, the processor converts the horizontal frame to the portrait frame and executes the input signal received by the touch input portion according to the portrait frame, wherein the processor further determines a relative location between the first body and the second body according to the first Euler angle and the second Euler angle, when it is determined that the second body is located on a left side of the first body, the processor defines a left side of the touch input portion as a press input region, and when the second body is located on a right side of the first body, the processor defines a right side of the touch input portion as the press input region.

6. The foldable electronic apparatus according to claim 5, wherein the processor further displays the portrait frame corresponding to an operating system of a tablet and adapts the touch input portion to perform at least one function corresponding to the operating system of the tablet.

7. The foldable electronic apparatus according to claim 6, wherein the processor further turns off the at least one function of the touch input portion.

8. The foldable electronic apparatus according to claim 6, wherein the processor further determines a location of the touch input portion relative to the first body and the second body according to the first Euler angle and the second Euler angle, when it is determined that the touch input portion is located on a back side of the first body and is located on a left side of the second body, the processor defines a left side of the touch input portion as a press input region, and when it is determined that the touch input portion is located on the back side of the first body and is located on a right side of the second body, the processor defines a right side of the touch input portion as the press input region.

* * * * *